United States Patent
Mathur (10) Patent No.: US 11,366,810 B2
(45) Date of Patent: Jun. 21, 2022

(54) INDEX CONTENTION UNDER HIGH CONCURRENCY IN A DATABASE SYSTEM

(71) Applicant: Salesforce.com, Inc., San Francisco, CA (US)

(72) Inventor: Rohitashva Mathur, Walnut Creek, CA (US)

(73) Assignee: salesforce.com, Inc., San Francisco, CA (US)

( * ) Notice: Subject to any disclaimer, the term of this patent is extended or adjusted under 35 U.S.C. 154(b) by 235 days.

(21) Appl. No.: 16/858,856

(22) Filed: Apr. 27, 2020

(65) Prior Publication Data

US 2021/0334273 A1    Oct. 28, 2021

(51) Int. Cl.
*G06F 16/2455* (2019.01)
*G06F 16/2458* (2019.01)

(52) U.S. Cl.
CPC ...... *G06F 16/2455* (2019.01); *G06F 16/2477* (2019.01)

(58) Field of Classification Search
CPC ............ G06F 16/2455; G06F 16/2477; G06F 16/2474; G06F 16/24553; G06F 16/901; G06F 16/903
USPC ........................................................ 707/769
See application file for complete search history.

(56) References Cited

U.S. PATENT DOCUMENTS

| | | | | |
|---|---|---|---|---|
| 5,491,815 A * | 2/1996 | Basso | ............... | H04L 29/06 713/502 |
| 6,219,662 B1 * | 4/2001 | Fuh | ............... | G06F 16/24553 707/999.102 |
| 6,338,056 B1 * | 1/2002 | Dessloch | ............... | G06F 16/2228 707/711 |
| 6,519,601 B1 * | 2/2003 | Bosch | ............... | G06F 16/2282 707/999.102 |
| 6,711,563 B1 * | 3/2004 | Koskas | ............... | G06F 16/284 707/769 |
| 7,882,087 B2 * | 2/2011 | Johnson | ............... | G06F 16/2393 707/700 |
| 8,892,515 B2 * | 11/2014 | Lyle | ............... | G06F 16/2228 707/620 |
| 9,128,965 B1 * | 9/2015 | Yanacek | ............... | G06F 16/213 |
| 9,165,074 B2 * | 10/2015 | Hendrey | ............... | G06F 16/951 |
| 9,336,258 B2 * | 5/2016 | Bhattacharjee | ..... | G06F 16/2343 |
| 9,442,980 B1 * | 9/2016 | Trepetin | ............... | G06F 16/2455 |
| 10,372,934 B2 | 8/2019 | Mathur et al. | | |
| 10,423,493 B1 * | 9/2019 | Vig | ............... | G06F 11/3055 |
| 10,452,630 B2 | 10/2019 | Tariq et al. | | |
| 10,552,443 B1 * | 2/2020 | Wu | ............... | G06F 16/2255 |
| 10,691,662 B1 * | 6/2020 | Harris | ............... | G06F 16/2255 |

(Continued)

FOREIGN PATENT DOCUMENTS

| | | |
|---|---|---|
| WO | 2018075839 A1 | 4/2018 |
| WO | 2019147580 A1 | 8/2019 |

*Primary Examiner* — Hanh B Thai (74) *Attorney, Agent, or Firm* — Kwan & Olynick LLP (57) ABSTRACT

A database query message may be received at a database system via a network. The database query message may include one or more parameters for retrieving data from a database based on a designated database record insertion timestamp. A database query may be executed against the database system to retrieve one or more database records based on a database record insertion timestamp range determined based on the designated database record insertion timestamp and including a plurality of database record insertion timestamp values.

19 Claims, 8 Drawing Sheets

(56) References Cited

U.S. PATENT DOCUMENTS

| | | | |
|---|---|---|---|
| 10,776,355 B1* | 9/2020 | Batsakis | G06F 16/2471 |
| 10,795,873 B1* | 10/2020 | Matthews | G06F 16/2255 |
| 10,838,940 B1* | 11/2020 | Wu | G06F 16/2237 |
| 10,977,227 B2* | 4/2021 | Lee | G06F 16/219 |
| 11,003,714 B1* | 5/2021 | Batsakis | G06F 16/901 |
| 11,030,174 B1* | 6/2021 | Hagerup | G06F 16/2246 |
| 11,080,253 B1* | 8/2021 | Leshinsky | G06F 16/2272 |
| 11,113,294 B1* | 9/2021 | Bourbie | G06F 16/24568 |
| 11,238,049 B1* | 2/2022 | James | G06F 40/205 |
| 11,250,056 B1* | 2/2022 | Batsakis | G06F 3/0604 |
| 2002/0174109 A1* | 11/2002 | Chandy | G06Q 30/02 |
| 2003/0055807 A1* | 3/2003 | Lomet | G06F 16/2322 |
| 2003/0204486 A1* | 10/2003 | Berks | G06F 16/2272 |
| 2003/0212675 A1* | 11/2003 | Denesuk | G06F 16/951 707/999.005 |
| 2006/0122876 A1* | 6/2006 | Von Schweber | G06Q 30/0203 705/7.33 |
| 2006/0235821 A1* | 10/2006 | Armangau | G06F 16/2477 |
| 2007/0233720 A1* | 10/2007 | Bae | G06F 16/2246 |
| 2007/0276843 A1* | 11/2007 | Lillibridge | G06F 16/125 |
| 2009/0106298 A1* | 4/2009 | Furusho | G06F 16/81 707/999.102 |
| 2009/0112853 A1* | 4/2009 | Nishizawa | G06F 16/24568 707/999.005 |
| 2009/0222419 A1* | 9/2009 | Lam | G06F 16/81 707/E17.127 |
| 2009/0265336 A1* | 10/2009 | Suntinger | G06Q 40/04 707/999.005 |
| 2010/0217995 A1* | 8/2010 | Enoki | G06F 16/24552 707/706 |
| 2011/0154371 A1* | 6/2011 | Beale | G06F 9/5027 719/319 |
| 2011/0302195 A1* | 12/2011 | Cai | G06F 16/83 707/769 |
| 2011/0320419 A1* | 12/2011 | Johnston | G06F 16/219 707/703 |
| 2013/0013617 A1* | 1/2013 | Cai | G06F 16/2272 707/769 |
| 2013/0018849 A1* | 1/2013 | Johnston | G06F 16/219 707/687 |
| 2014/0078163 A1* | 3/2014 | Cammert | G06F 16/24568 345/589 |
| 2014/0089265 A1* | 3/2014 | Talagala | G06F 16/22 707/674 |
| 2014/0172803 A1* | 6/2014 | Diaconu | G06F 16/1873 707/649 |
| 2015/0088903 A1* | 3/2015 | Konik | G06F 16/2282 707/746 |
| 2015/0178286 A1* | 6/2015 | Dhollander | G05B 19/41875 707/728 |
| 2015/0324414 A1* | 11/2015 | Noguchi | G06F 16/13 707/690 |
| 2016/0019227 A1* | 1/2016 | Hendrey | G06F 16/24575 707/706 |
| 2016/0078044 A1* | 3/2016 | Diaconu | G06F 16/128 707/649 |
| 2016/0147786 A1* | 5/2016 | Andrei | G06F 16/2272 707/695 |
| 2016/0147811 A1* | 5/2016 | Eluri | G06F 16/2228 707/694 |
| 2016/0328488 A1* | 11/2016 | Lytle | G06F 16/252 |
| 2017/0139996 A1* | 5/2017 | Marquardt | G06F 16/2455 |
| 2017/0212935 A1* | 7/2017 | Irie | G06F 16/2477 |
| 2017/0365000 A1* | 12/2017 | Wittkotter | G06F 16/2456 |
| 2018/0052887 A1* | 2/2018 | Soncodi | G06F 9/5005 |
| 2018/0107711 A1 | 4/2018 | Tariq et al. | |
| 2018/0107714 A1 | 4/2018 | Tariq et al. | |
| 2018/0114033 A1 | 4/2018 | Mathur | |
| 2018/0123885 A1* | 5/2018 | Stenberg | H04L 41/0853 |
| 2018/0129691 A1 | 5/2018 | Mathur | |
| 2018/0150533 A1 | 5/2018 | Mathur | |
| 2018/0285421 A1* | 10/2018 | Tsuchida | G06F 16/2455 |
| 2018/0322168 A1* | 11/2018 | Levine | G06F 16/2471 |
| 2018/0329942 A1* | 11/2018 | Kawanoue | G06F 16/2282 |
| 2019/0130002 A1 | 5/2019 | Mathur | |
| 2019/0138658 A1 | 5/2019 | Mathur | |
| 2019/0228171 A1 | 7/2019 | Mathur | |
| 2019/0236171 A1 | 8/2019 | Mathur | |
| 2019/0238427 A1* | 8/2019 | Guan | H04L 67/20 |
| 2019/0238428 A1* | 8/2019 | Guan | H04L 67/20 |
| 2019/0243914 A1* | 8/2019 | Lugowski | G06F 16/24532 |
| 2019/0310975 A1* | 10/2019 | Banister | G06F 16/2379 |
| 2019/0310977 A1* | 10/2019 | Pal | G06F 16/2455 |
| 2019/0354620 A1* | 11/2019 | Eluri | G06F 16/2379 |
| 2019/0384840 A1 | 12/2019 | Mathur | |
| 2019/0384846 A1 | 12/2019 | Mathur | |
| 2019/0392061 A1* | 12/2019 | Terry | G06F 9/466 |
| 2020/0042199 A1* | 2/2020 | Rozas | H04L 67/2842 |
| 2020/0057819 A1 | 2/2020 | Mathur | |
| 2020/0073987 A1* | 3/2020 | Perumala | G06F 16/24545 |
| 2020/0097571 A1 | 3/2020 | Mathur | |
| 2020/0097575 A1 | 3/2020 | Mathur | |
| 2020/0204463 A1* | 6/2020 | Guan | H04L 41/5096 |
| 2020/0320091 A1* | 10/2020 | Wu | G06F 16/2228 |
| 2020/0328976 A1* | 10/2020 | Koral | H04L 47/125 |
| 2020/0372004 A1* | 11/2020 | Barber | G06F 16/2272 |
| 2021/0117868 A1* | 4/2021 | Sriharsha | G06F 16/2246 |

\* cited by examiner

INDEX CONTENTION UNDER HIGH CONCURRENCY IN A DATABASE SYSTEM

FIELD OF TECHNOLOGY

This patent document relates generally to database systems and more specifically to index contention in database systems.

BACKGROUND

Database systems store data in a tabularized format. Each row of a database is typically associated with one or more indexes. Indexing database rows provides numerous advantages, such as the ability to rapidly query and retrieve data, as well as quickly linking data stored in different database tables. Many indexed column values in database systems increase monotonically or near monotonically with time. For example, a system modification stamp identifies the time at which a row was written (e.g., inserted or updated). Accordingly, the system modification stamp increases with successive database write requests.

Creating and maintaining database indexes can create significant slowdowns in modern database systems during periods of high concurrency. High concurrency refers to a situation in which the database system receives many write requests in a short period of time. Database indexes are typically stored in a data structure such as a B-tree. During periods of high concurrency, updating the data structure used to store the sorted monotonically or near monotonically increasing indexed column values may impose a bottleneck on executing the write requests. Conventional approaches to addressing this issue not only impose significant costs, but also fail to entirely solve the problem. Accordingly, improved techniques for resolving index contention under high concurrency are desired.

BRIEF DESCRIPTION OF THE DRAWINGS

The included drawings are for illustrative purposes and serve only to provide examples of possible structures and operations for the disclosed inventive systems, apparatus, methods and computer program products for reading and writing information in a database system. These drawings in no way limit any changes in form and detail that may be made by one skilled in the art without departing from the spirit and scope of the disclosed implementations.

DETAILED DESCRIPTION

Techniques and mechanisms described herein may be used to resolve index contention under high concurrency in a database system. When processing a database write request that involves maintaining an index on a column whose values increase monotonically (or near monotonically), the newly created index values may be spread out over a localized range so that they are no longer monotonically increasing over this localized range. Then, when the database system receives a query that identifies data to read based on the index, the system may retrieve data associated with a localized range of index values.

Many database system indexes increase with time. For example, a system modification stamp identifies the time at which a row was written (e.g., inserted or updated). Accordingly, the system modification stamp increases with successive database write requests. Database systems are frequently queried using indexes. For example, in the case of a system modification stamp, a query may request to access all data rows modified after a particular date and time. In order to support such queries, database indexes are stored in a data structure that provides for rapid identification of rows based on index values without requiring a full table scan. However, such an approach can create a bottleneck since new entries in the index data structure (which is referred to herein as a "new index" or "new index value") are typically stored in the same part of the data structure. Accordingly, the throughput for executing database write requests is limited not by the speed of writing the data itself, but rather by the speed of updating the portion of the data structure in which the most recent indexes are stored. This problem is discussed in additional detail with respect to FIG. 2.

In conventional systems, index contention is often addressed by sharding the index. Sharding an index may involve associating the index with an additional database column in which the shard identifier is stored. Each shard may then be associated with its own logical or physical data structure for maintaining a sorted index within the shard. A query on the index must then include both the shard identifier and the index value. Such an approach is associated with a variety of drawbacks. First, queries must be written to be sharding-aware since sharding is not transparent to the application submitting the query. Second, developers need to know about the additional column and account for it in their code, which can introduce bugs and reduce performance. Third, access to sorted data that comes naturally with an index must be performed explicitly across N shards in a sharded system, which imposes both conceptual weight and a performance penalty that can increase with the number of shards. Fourth, implementing and rolling out a sharded index system requires substantial effort and increases the database system's complexity. Fifth, a shard can become "hot", for instance by being associated with a disproportionate number of database write requests, causing index contention within the shard. That is, not only does sharding impose considerable costs and risks, it does not even fully address the index contention problem.

In contrast to conventional approaches, embodiments of techniques and mechanisms described herein provide for the substantial reduction or elimination of index contention without the drawbacks associated with sharding. Such techniques and mechanisms may substantially improve the performance of database systems under high concurrency situations. In addition, embodiments of techniques and mechanisms described herein may be implemented in a way that is opaque to end users and system developers, thus providing performance improvements without requiring end users to change the way in which they access the database system.

Consider the example of Alexandra, a database system administrator. When using conventional techniques to configure and administer the database system, index contention slows down database access when the system receives many write requests within a short period of time. Because the database system is subject to service level agreements (SLAs), Alexandra must resolve the slow speed. Additional hardware resources are not only expensive, but also do little to help the problem since the contention issue is a function of writing database indexes (i.e., metadata) and not data. Instead, Alexandra must implement a sharded index. However, as discussed above, sharding the index involves substantial effort on Alexandra's part. Moreover, Alexandra must work with the developers of applications that access the database to ensure that applications are updated with a new query structure that reflects the additional column associated with sharding. Finally, sharding does not entirely solve the problem, since a single shard can sometimes receive an excessive number of requests, thus repeating the initial index contention problem.

In contrast to conventional techniques, techniques and mechanisms described herein allow Alexandra to remedy the index contention problem quickly and efficiently, without sharding and in a manner nearly or entire opaque to end users of the database. That is, application developers need not alter the queries that their applications submit to the database. Resolving the index contention issue using such techniques and mechanisms provides a substantial speedup during periods in which many database write requests are submitted at once.

Figure 1:
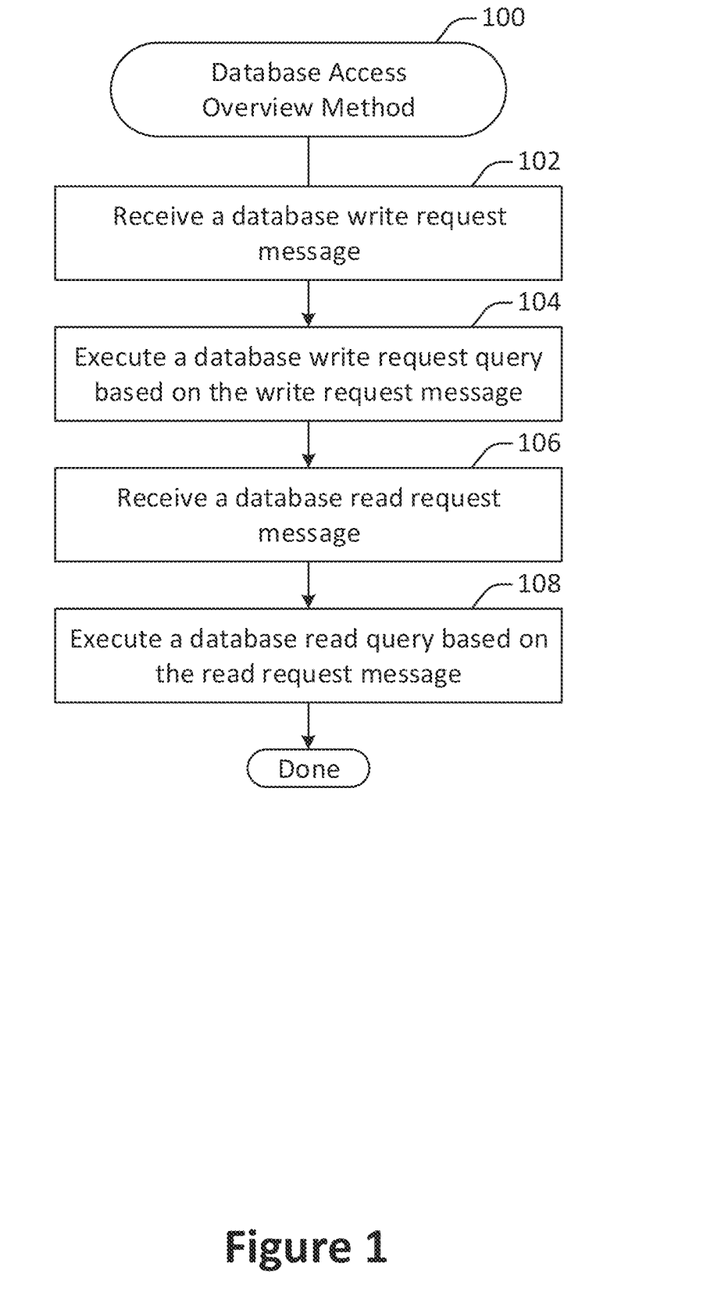
FIG. 1 illustrates an example of an overview method for accessing a database system, performed in accordance with one or more embodiments.

FIG. 1 illustrates an example of an overview method 100 for accessing a database system, performed in accordance with one or more embodiments. The method 100 may be used to store data to, and retrieve data from, a database system.

A database write request message is received at 102. According to various embodiments, the database write request message may include information for querying a database system. That information may be a database query itself, or may include information for generating a query. For example, the database write request message may include a query written in a language such as MySQL. As another example, the database write request message may include a query written using an abstraction layer, such as Salesforce Object Query Language (SOQL).

A database write request query is executed at 104. In some implementations, the executed write request query may be substantially similar or identical to a query received in the database write request message. Alternatively, the executed write request query may be a translated version of information included in the write query request message. For example, a SOQL query may be translated into Oracle SQL for executing in an Oracle database, or another language suitable for executing in a SQL Server, IBM DB2, or HSpace database. As another example, issued SQL may be further written into another form to take into account indexing as described herein, for instance by including additional filters.

According to various embodiments, as part of the execution process, an index entry may be generated. The generation of the new index entry may be performed in such a way as to reduce index contention. For example, rather than strictly incrementing the most recent index value to generate a new index value, new index values may instead be spread out over a range, leading the index values to no longer be monotonically increasing or nearly monotonically increasing over that range. Insertion of the new index entries into the sorted data structure may then be spread out over a range of data blocks rather than concentrated in a single data block. Additional details regarding executing a write request and generating a new database index entry are discussed with respect to FIG. 2, FIG. 3, and FIG. 4.

A database read request message is received at 106. According to various embodiments, as discussed with respect to the operation 102, the database read request message may include information for querying a database system. That information may be a database query itself, or may include information for generating a query. For example, the database read request message may include a query written in a language such as MySQL. As another example, the database read request message may include a query written using an abstraction layer, such as Salesforce Object Query Language (SOQL).

A database read request query is executed at 108. In some implementations, the executed read request query may be substantially similar or identical to a query received in the database read request message. Alternatively, the executed read request query may be a translated version of information included in the read query request message. For example, a SOQL query may be translated into Oracle SQL for executing in an Oracle database.

According to various embodiments, as part of the execution process, a query term included in the database read request message in which an index value is specified may be altered or translated to encompass either a range of index values or an equivalent single value. In this way, the system may return an accurate response to the query despite generating a new index value in operation 104 that did not adhere to a strict incrementing of the preceding index value. Additional details regarding executing a read request are discussed with respect to FIG. 2 and FIG. 5.

Figure 2:
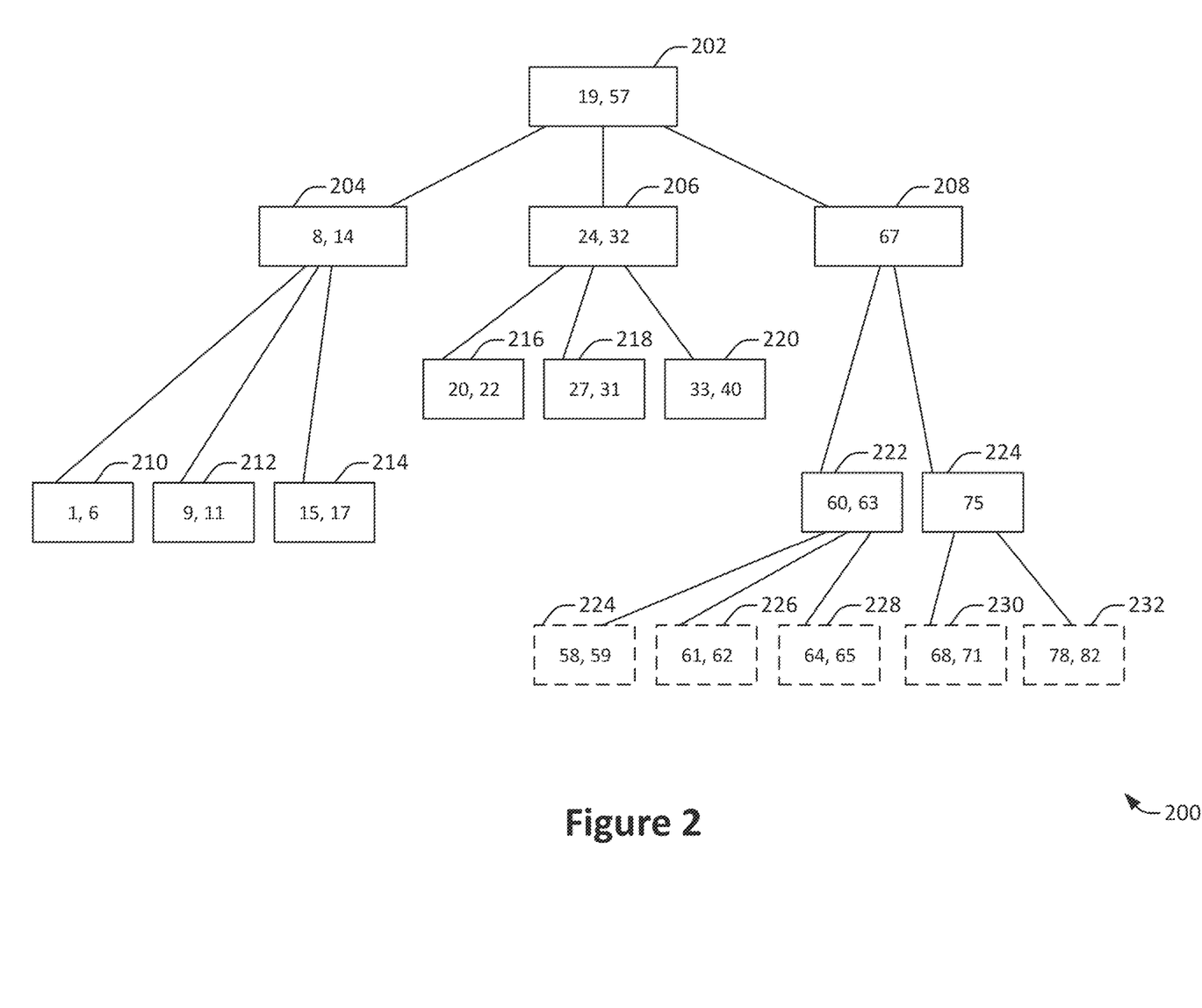
FIG. 2 illustrates an example of a data structure in a database system, configured in accordance with one or more embodiments.

FIG. 2 illustrates an example of a data structure 200 in a database system, configured in accordance with one or more embodiments. According to various embodiments, the data structure 200 is a B-tree, which may be used to store indexes in a database system in an ordered format. Although other data structures may be employed, many modern database systems employ a B-tree, and alternative data structures exhibit similar properties for the purposes of the techniques and mechanisms described herein.

According to various embodiments, a B-tree is composed of nodes and connections between nodes. For example, the B-tree 200 includes a root node 202, internal nodes 204, 206, and 208, and leave nodes 210-224, connected as shown in FIG. 2. The leaf nodes 224-232 include index values that have not yet been added to the database and will be discussed in additional detail with respect to the method 300 shown in FIG. 3.

According to various embodiments, each node includes one or more values that correspond to a database index. For example, the node 208 includes the index values 65 and 80. Each node also includes references to database records. For instance, the node 208 includes references to the records corresponding to the database indexes 65 and 80 so that those records may be retrieved directly without traversing the database table. Note that a B-tree need not be complete since the rows associated with some index values may have been deleted.

According to various embodiments, a B-tree is a tree data structure that keeps data sorted and allows searches, insertions, and deletions in logarithmic amortized time. The B-tree is a self-balancing generalization of the binary search tree, allowing for nodes with more than two children.

According to various embodiments, each internal node of a B-tree contains a number of keys. The keys act as separation values which divide its subtrees. For example, if an internal node has 3 child nodes (or subtrees) then it has 2 key to separate those three values. As one example from FIG. 2, the node 202 includes two keys (i.e., 19 and 57). Therefore, node 204 and its children include values less than 19, node 206 and its children include values between 19 and 57, and node 208 and its children include values greater than 57. As another example from FIG. 2, the node 208 includes a single key (i.e., 67). Therefore, node 222 includes values less than 67, but still greater than 57, while node 224 includes values greater than 67.

In some embodiments, an index stored in a database may represent a timestamp that indicates when the database record was most recently created or updated. In some configurations, a timestamp may be represented as a numerical integer. For example, each timestamp may be encoded as a number of seconds that have elapsed since 1 Jan. 1970, minus leap seconds. Alternatively, a timestamp may be stored in a different format.

It should be noted that in an actual database, index values may be much larger than those shown in FIG. 2. Further, a B-tree storing index values in an actual database may have many more nodes than shown in FIG. 2. Also, A B-tree in an actual database may be substantially wider in the sense that most nodes store many more than 2 keys.

Suppose for the purpose of illustration that the database associated with FIG. 2 received many requests to write new data to the database within a short period of time. Under a conventional system in which indexes were monotonically increasing, a new index value would be generated for each result by incrementing the largest previously-assigned index value. For example, since the largest index value assigned in the database is 70, the next three records inserted would be assigned the index values 71, 72, and 73. Each of these indexes would need to be written to the right-most node in the tree (i.e., node 224 in FIG. 2). In a database, each node may correspond to a block of memory. Accordingly, the writing of the next three records would be limited by the speed at which each of the three new indexes could be written to the same block of memory corresponding to the node 224. For example, the database may acquire and release a lock on the memory block for each new index value. As another example, the new index value insertion may be paused while the right-most node is split when it gets full. For such reasons, index contention can impose a considerable slowdown during periods of high concurrency.

Figure 3:
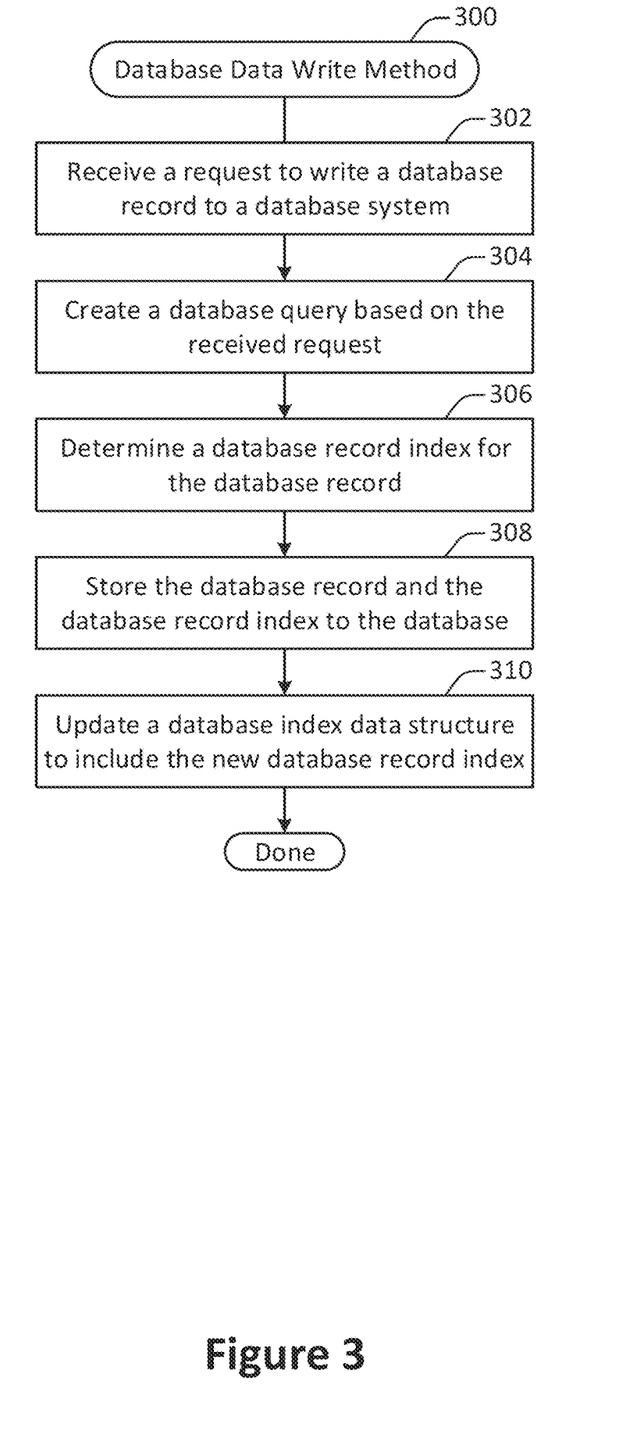
FIG. 3 illustrates an example of a method for writing information to a database system, performed in accordance with one or more embodiments.

FIG. 3 illustrates an example of a method 300 for writing information to a database system, performed in accordance with one or more embodiments. According to various embodiments, the method 300 may be performed in order to create or update a record having a database index determined in accordance with techniques and mechanisms described herein.

A request to write a database record to a database system is received at 302. According to various embodiments, the request may be received from an application, such as an application within an on-demand computing services environment. Alternatively, the request may be received from a different source, such as a database script.

A database query is created based on the request at 304. In some implementations, creating the database query may involve translating the request from an abstracted query language, such as SOQL, to a query language suitable for an underlying database, such as Oracle SQL. Alternatively, or additionally, creating the database query may involve rewriting submitted SQL to a different form.

A database record index for the database record is determined at 306. In some implementations, the database record index may be created by transforming a value associated with a recently created index. For example, the system may maintain an incremented index value that is incremented with each successive database index. The incremented index value may then be transformed to create the actual index value.

According to various embodiments, the transformation may be created based on the observation that even when used for querying purposes, indexes need not be strictly incremented in order to be useful. For example, in many database systems, the system modification timestamp does not represent either the time the transaction began or ended. Instead, the system modification timestamp is a value that lies somewhere in between the beginning and end of a database transaction. Alternatively, or additionally, the system modification timestamp may differ from other concurrent values due to clock drifts.

This characteristic is common to many modern database systems. As another example, different rows (i.e., database records) that are part of the same database transaction may receive different system modification timestamp values. Accordingly, database systems often allow localized flexibility for index values in the sense that even an index representing a timestamp does not identify a time at which a database record was written in a highly precise manner.

In some implementations, the transformation may effectively spread the actual index values around the incremented index value. A wide variety of transformation functions may be used to perform such a transformation. For example, a transformation function such as that shown in Equation (1) may be applied to the incremented index value, where $index_{orig}$ corresponds to the incremented index value, $index_{new}$ corresponds to the transformed index value, N and X correspond to spread parameters, and random indicates a random number between 1 and X.

$$index_{new} = index_{orig} + (N - \text{modulo}(index_{orig}, N)) + \text{random}(1, X) \quad (1)$$

In particular embodiments, a different transformation function may be used. For example, in Equation (1) and (2), the second term (i.e., $N - \text{modulo}(index_{orig}, N)$) may help to improve the probability of a spread that breaks sequence monotonicity in the local range of values, but alternatively could be omitted.

Figure 4A:
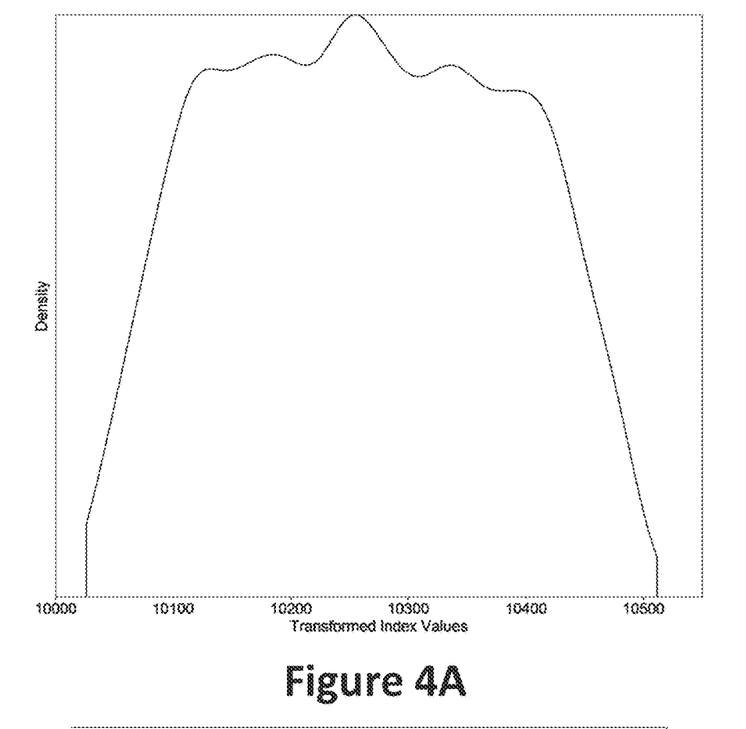
FIG. 4A and FIG. 4B illustrate plots generated in accordance with one or more embodiments.
Figure 4B:
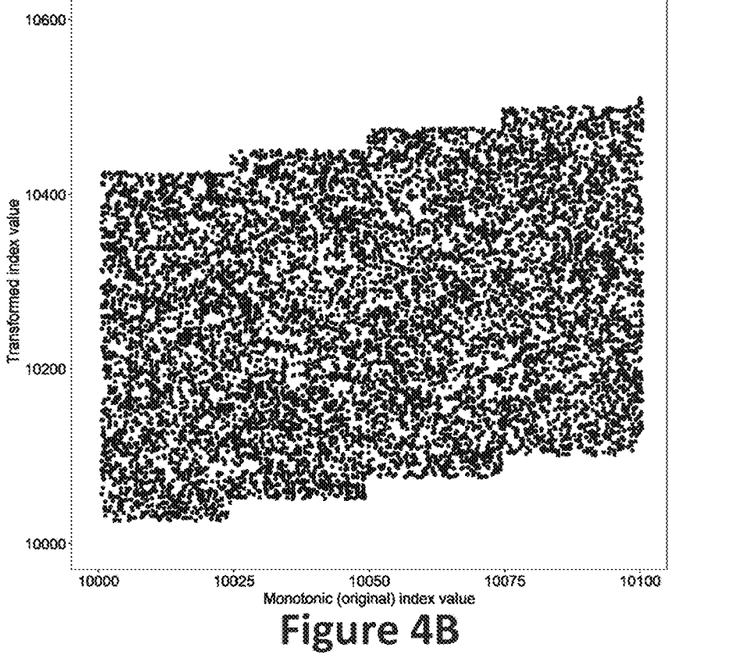

FIG. 4A illustrates a density plot of this function for $index_{orig}$ values of 10001 through 10100, N=25, and X=400, simulated with 1,000 iterations. As shown in FIG. 4A, instead of employing strictly increasing values of 10001 through 10100, for these parameters the actual index values are spread out from 10050 through 10550. FIG. 4B illustrates a jittered scatter plot of the same function and parameter values. As shown in FIG. 4B, each index value is transformed into a random value selected from a range in such a way that local monotonicity is broken. In this way, the writes to the B-tree are spread out over multiple nodes (or relatively many) rather than concentrated in a single (or relatively few) nodes.

FIG. 2 shows an example of the effects of such a spread. New database records are associated with indexes 58, 59, 61, 62, 63, 65, 68, 71, 78, and 82, which are spread across several nodes in the B-tree. Because different nodes correspond to different data blocks, spreading out the new indexes in this fashion substantially reduces index contention. That is, different new indexes are written to (on average) different data blocks rather than a single data block.

It should be noted that although FIG. 2 and FIG. 4 present examples that employ integer index values for the purpose of illustration, other types of indexes may be used. For example, the indexed column may store timestamp values. It should also be noted that insertion timestamps are implicitly monotonically increasing, since each successive update request is executed at a later point in time than the preceding update request.

According to various embodiments, the specific spread parameters may be strategically determined based on characteristics of the database system. For example, larger spread parameters may be used to decrease contention, but excessively large spread parameters may slightly decrease read performance by requiring the retrieval of a greater number of records for index-based queries.

At 308, the database record and the database record index are stored to the database. According to various embodiments, storing the database record and the database record index to the database may involve performing a conventional insert or update operation in which the transformed database record index is employed instead of the incremented database index.

In particular embodiments, the original, monotonically increase value may be stored in a new column. In this way, the original database value may be used for more precise querying during the execution of data read queries if desired.

In particular embodiments, a different transformation function may be used such that the original value can be deduced from the transformed value. For example, in the transformation shown in Equation (2), the random function employed in Equation (1) has been replaced with a hash function on the primary key with a range of 1 to X. Equation (2) provides for an invertible function conditional on the assumption that the primary key is never updated. That is, the new index can be determined precisely given the spread parameters, the original index, and the primary key.

$$index_{new} = index_{orig} + (N - modulo(index_{orig}, N) + hash(primary\_key)[1,X]$$ (2)

It should be noted that Equations 1 and 2 are only examples of an infinite number of possible non-invertible and invertible functions may be used. For example, invertible functions need not rely on the primary key or indeed on any other key. For instance, an invertible function may instead depend on some other immutable column associated with the database entry.

According to various embodiments, an index such as a system modification stamp may be set in a database system trigger. Accordingly, that same trigger can generate the transformed index value instead of a conventional incremented indexed value.

The database index data structure is updated at 310 to include the new database record index. According to various embodiments, updating the database index data structure may involve updating a B-tree or other data structure by inserting the new index value, as discussed with respect to FIG. 2.

In particular embodiments, an index may be mapped to a range of possible values that are located proximate to the index. For example, a timestamp may be mapped to one of a range of values that fall between the timestamp and a point one, five, or ten minutes, seconds, microseconds, nanoseconds, or any other suitable unit of time later than the timestamp. As another example, an integer index may be mapped to one of a range of values that fall within a designated distance from the integer index. Allowing for a larger distance between the original index value and the mapped index value may provide for reduced contention, while allowing for a smaller distance between the original index value and the mapped index value may provide for more efficient data retrieval query execution. Accordingly, the specific range employed in a particular database system may be strategically determined based considerations such as the characteristics of that database system and a desired service level for data insertion and/or retrieval.

Figure 5:
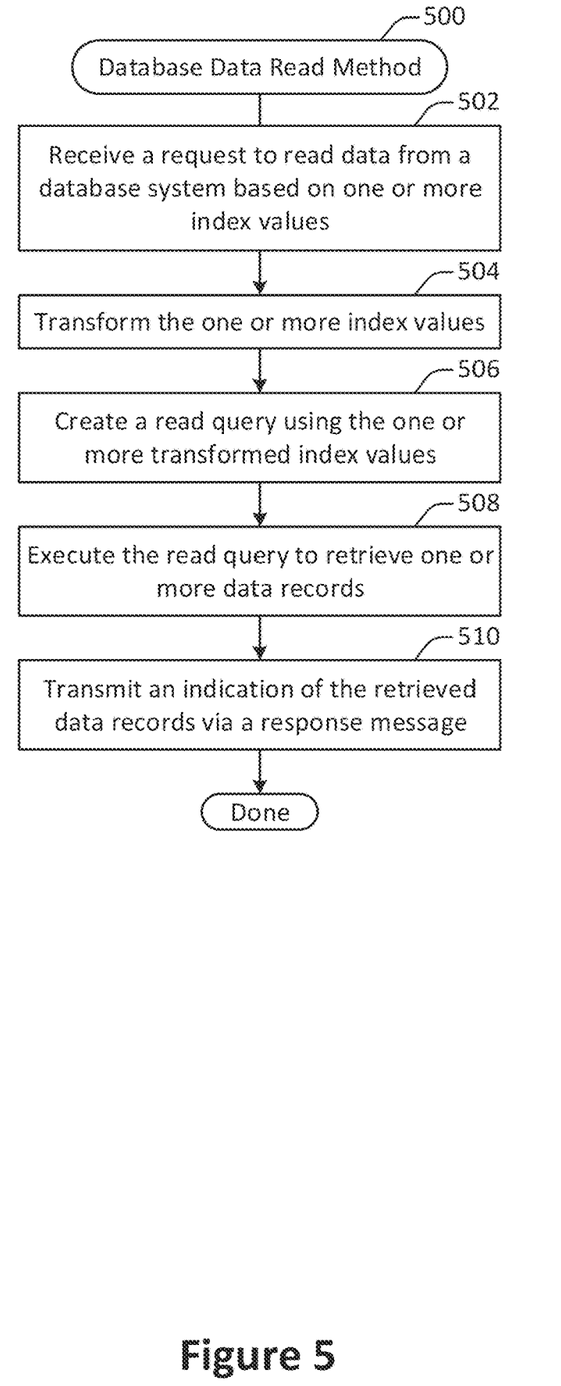
FIG. 5 illustrates an example of a method for reading information from a database system, performed in accordance with one or more embodiments.

FIG. 5 illustrates an example of a method 500 for reading information from a database system, performed in accordance with one or more embodiments. According to various embodiments, the method 500 may be used to retrieve one or more database records from a database system in which database indexes have been transformed in accordance with techniques and mechanisms described herein.

A request to read data from a database system is received at 502. The request may include one or more index values. For example, the request may indicate a desire to retrieve records created or altered before or after a designated date. As another example, the request may indicate a desire to retrieve records created or altered between two dates. As yet another example, the request may indicate a desire to retrieve records created at a specific timestamp having a specific index value.

According to various embodiments, the request may be received from an application, such as an application within an on-demand computing services environment. Alternatively, the request may be received from a different source, such as a database script.

At 504, the one or more index values are transformed. According to various embodiments, the way in which the one or more index values are transformed during the execution of write request may depend on the way in which the index values were transformed when the database records were initially written.

In some embodiments, for instance in the case of Equation (1), an index value may be shifted by the maximum transformation delta. For example, if the spread parameters are such that an original incremented index value of X may be replaced with a transformed index value as large as X+150, then a query seeking to retrieve records stored before X may be altered to instead retrieve any records stored before X+150. If instead a query seeks to retrieve records stored after X, then the index value may be left alone since the transformation in Equation (1) yields transformed values strictly larger than the incremented index.

As another example, if the spread parameters are such that an original incremented index value of X may be replaced with a transformed index value of between X+30 and X+150, then a query seeking to retrieve records stored at precisely X may be altered to instead retrieve any records stored between X+30 and X+150. If a precise value is needed, then a secondary column in which the original monotonically increasing index value is stored may be used to filter these initial results to provide an exact solution. Alternately, a spread function for which an efficient inverse function only on the index value (e.g., the monotonically increasing value) exists, in which case the function can be invoked to retrieve the exact value.

It should be noted that although examples are described herein for the purpose of illustration as having a transformed index value that is strictly greater than the original value, in some embodiments a transformed index value that is strictly less than the original value may be used. Accordingly, depending on whether the transformed index value is strictly greater than, strictly less than, or neither strictly greater than or less than the original value, upon record retrieval an original index value may be transformed by adding or subtracting from an index value included as a query parameter.

In some embodiments, for instance in the case of Equation (2), an index value may again be shifted by the maximum transformation delta, as is the case in Equation (1). However, the results may then be filtered within the query to retrieve more precise values by applying the inverse of the transformation function to the initial results.

A database query is created based on the request at 506. In some implementations, creating the database query may involve translating the request from an abstracted query language, such as SOQL, to a query language suitable for an underlying database, such as Oracle SQL.

The read query is executed to retrieve one or more data records at 508. As discussed with respect to the operation 504, executing the read query may involve a two-part process in which results are initially retrieved and then filtered based on a value such as the original incremented index value.

An indication of the retrieved data records is transmitted at 510. According to various embodiments, transmitting the indication of the retrieved data records may involve transmitting the actual data records to an application, database script source, or other source of the message received at operation 302. Alternatively, or additionally, an indication of the completion of the query may be transmitted, allowing the actual results to be retrieved upon later request.

According to various embodiments, any of the index values described herein may be implemented as a timestamp. For example, a last-modified date of 12:00 may be transformed to a value of between 12:01 and 12:05. Various transformations are possible depending on the transformation function and associated parameters.

According to various embodiments, an index value may be combined with another value. For example, in a multi-tenant database a last-modified timestamp may be combined with an organization identifier to create an index that is queryable within a particular organization.

Figure 6:
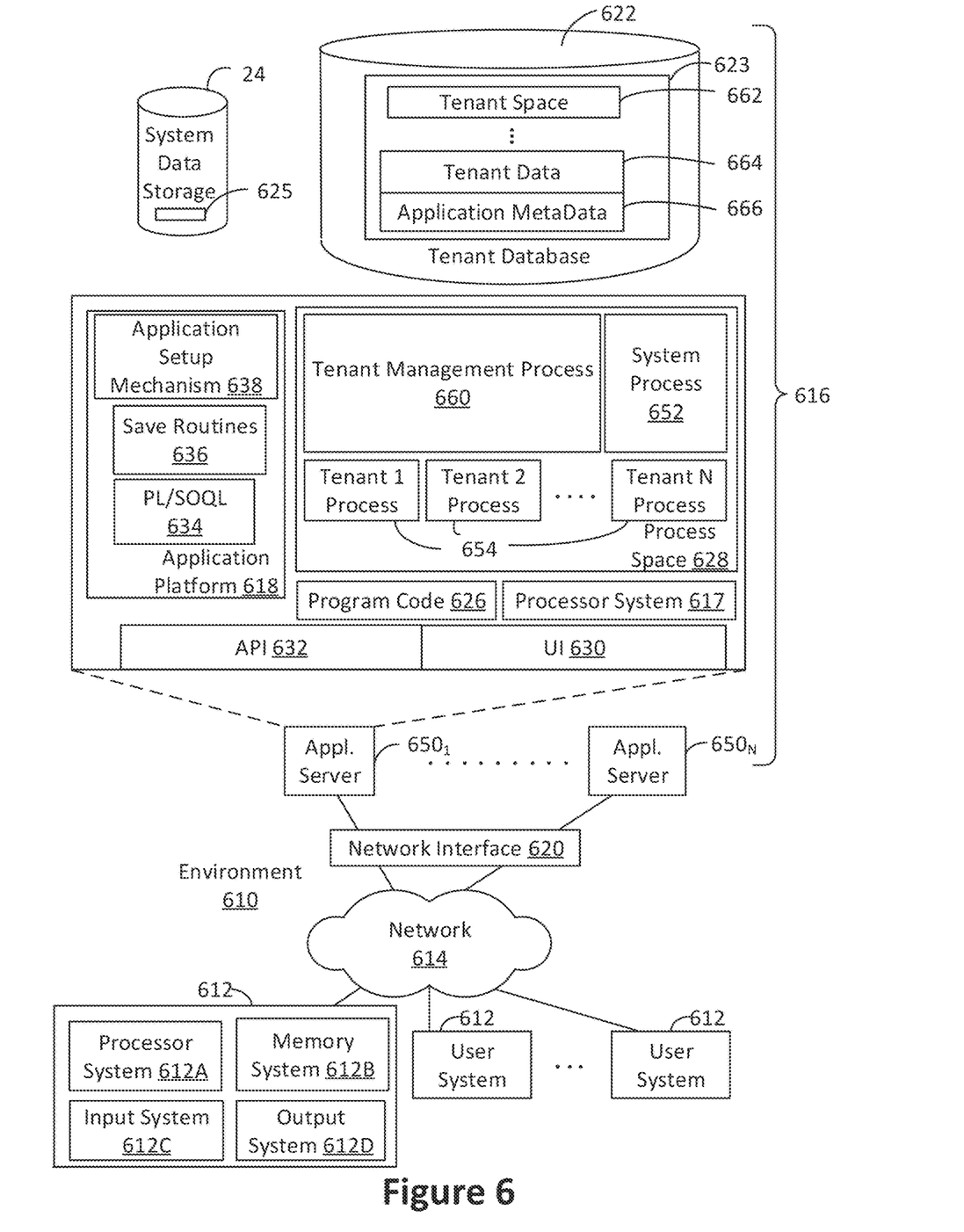
FIG. 6 shows a block diagram of an example of an environment that includes an on-demand database service configured in accordance with some implementations.

FIG. 6 shows a block diagram of an example of an environment 610 that includes an on-demand database service configured in accordance with some implementations. Environment 610 may include user systems 612, network 614, database system 616, processor system 617, application platform 618, network interface 620, tenant data storage 622, tenant data 623, system data storage 624, system data 625, program code 626, process space 628, User Interface (UI) 630, Application Program Interface (API) 632, PL/SOQL 634, save routines 636, application setup mechanism 638, application servers 650-1 through 650-N, system process space 652, tenant process spaces 654, tenant management process space 660, tenant storage space 662, user storage 664, and application metadata 666. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 616, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 616. Such applications may be developed by the database service provider or by users or third-party application developers accessing the service. Application platform 618 includes an application setup mechanism 638 that supports application developers' creation and management of applications, which may be saved as metadata into tenant data storage 622 by save routines 636 for execution by subscribers as one or more tenant process spaces 654 managed by tenant management process 660 for example. Invocations to such applications may be coded using PL/SOQL 634 that provides a programming language style interface extension to API 632. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 666 for a subscriber making such an invocation. Such system processes may also manage execution of application metadata 666 as an application in a virtual machine.

In some implementations, each application server 650 may handle requests for any user associated with any organization. A load balancing function (e.g., an F5 Big-IP load balancer) may distribute requests to the application servers 650 based on an algorithm such as least-connections, round robin, observed response time, etc. Each application server 650 may be configured to communicate with tenant data storage 622 and the tenant data 623 therein, and system data storage 624 and the system data 625 therein to serve requests of user systems 612. The tenant data 623 may be divided into individual tenant storage spaces 662, which can be either a physical arrangement and/or a logical arrangement of data. Within each tenant storage space 662, user storage 664 and application metadata 666 may be similarly allocated for each user. For example, a copy of a user's most recently used (MRU) items might be stored to user storage 664. Similarly, a copy of MRU items for an entire tenant organization may be stored to tenant storage space 662. A UI 630 provides a user interface and an API 632 provides an application programming interface to system 616 resident processes to users and/or developers at user systems 612.

System 616 may implement a web-based database system. For example, in some implementations, system 616 may include application servers configured to implement and execute database-related software applications. The application servers may be configured to provide related data, code, forms, web pages and other information to and from user systems 612. Additionally, the application servers may be configured to store information to, and retrieve information from a database system. Such information may include related data, objects, and/or Webpage content. With a multi-tenant system, data for multiple tenants may be stored in the same physical database object in tenant data storage 622, however, tenant data may be arranged in the storage medium(s) of tenant data storage 622 so that data of one tenant is kept logically separate from that of other tenants. In such a scheme, one tenant may not access another tenant's data, unless such data is expressly shared.

Several elements in the system shown in FIG. 6 include conventional, well-known elements that are explained only briefly here. For example, user system 612 may include processor system 612A, memory system 612B, input system 612C, and output system 612D. A user system 612 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 612 to access, process and view information, pages and applications available from system 616 over network 614. Network 614 may be any network or combination of networks of devices that communicate with one another, such as any one or any combination of a LAN (local area network), WAN (wide area network), wireless network, or other appropriate configuration.

The users of user systems 612 may differ in their respective capacities, and the capacity of a particular user system 612 to access information may be determined at least in part by "permissions" of the particular user system 612. As discussed herein, permissions generally govern access to computing resources such as data objects, components, and other entities of a computing system, such as a database system, a social networking system, and/or a CRM database system. "Permission sets" generally refer to groups of permissions that may be assigned to users of such a computing environment. For instance, the assignments of users and permission sets may be stored in one or more databases of System 616. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 616 may provide on-demand database service to user systems 612 using an MTS arrangement. By way of example, one tenant organization may be a company that employs a sales force where each salesperson uses system 616 to manage their sales process. Thus, a user in such an organization may maintain contact data, leads data, customer follow-up data, performance data, goals and progress data, etc., all applicable to that user's personal sales process (e.g., in tenant data storage 622). In this arrangement, a user may manage his or her sales efforts and cycles from a variety of devices, since relevant data and applications to interact with (e.g., access, view, modify, report, transmit, calculate, etc.) such data may be maintained and accessed by any user system 612 having network access.

When implemented in an MTS arrangement, system 616 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 616 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 616 may also maintain system-level data usable by multiple tenants or other data. Such system-level data may include industry reports, news, postings, and the like that are sharable between tenant organizations.

In some implementations, user systems 612 may be client systems communicating with application servers 650 to request and update system-level and tenant-level data from system 616. By way of example, user systems 612 may send one or more queries requesting data of a database maintained in tenant data storage 622 and/or system data storage 624. An application server 650 of system 616 may automatically generate one or more SQL statements (e.g., one or more SQL queries) that are designed to access the requested data. System data storage 624 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 7A:
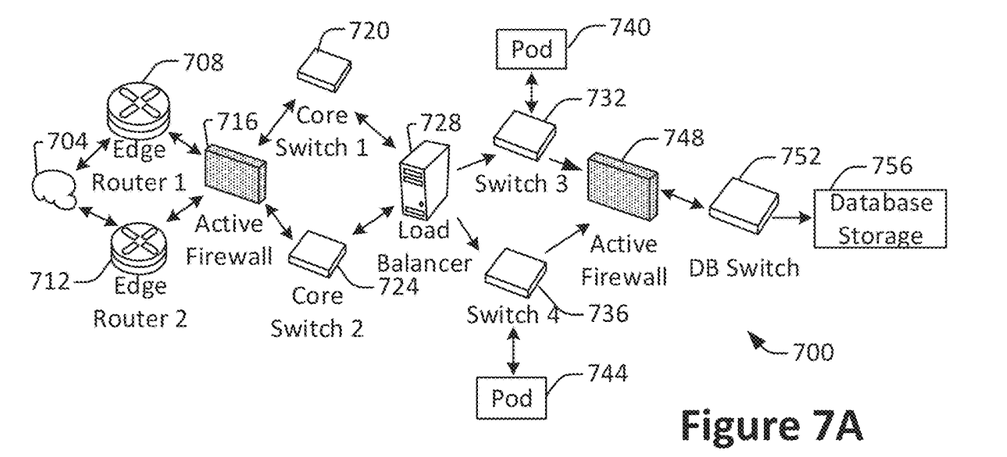
FIG. 7A shows a system diagram of an example of architectural components of an on-demand database service environment, configured in accordance with some implementations.

FIG. 7A shows a system diagram of an example of architectural components of an on-demand database service environment 700, configured in accordance with some implementations. A client machine located in the cloud 704 may communicate with the on-demand database service environment via one or more edge routers 708 and 712. A client machine may include any of the examples of user systems 612 described above. The edge routers 708 and 712 may communicate with one or more core switches 720 and 724 via firewall 716. The core switches may communicate with a load balancer 728, which may distribute server load over different pods, such as the pods 740 and 744 by communication via pod switches 732 and 736. The pods 740 and 744, which may each include one or more servers and/or other computing resources, may perform data processing and other operations used to provide on-demand services. Components of the environment may communicate with a database storage 756 via a database firewall 748 and a database switch 752.

Accessing an on-demand database service environment may involve communications transmitted among a variety of different components. The environment 700 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 7A and 7B.

The cloud 704 refers to any suitable data network or combination of data networks, which may include the Internet. Client machines located in the cloud 704 may communicate with the on-demand database service environment 700 to access services provided by the on-demand database service environment 700. By way of example, client machines may access the on-demand database service environment 700 to retrieve, store, edit, and/or process information.

In some implementations, the edge routers 708 and 712 route packets between the cloud 704 and other components of the on-demand database service environment 700. The edge routers 708 and 712 may employ the Border Gateway Protocol (BGP). The edge routers 708 and 712 may maintain a table of IP networks or 'prefixes', which designate network reachability among autonomous systems on the internet.

In one or more implementations, the firewall 716 may protect the inner components of the environment 700 from internet traffic. The firewall 716 may block, permit, or deny access to the inner components of the on-demand database service environment 700 based upon a set of rules and/or other criteria. The firewall 716 may act as one or more of a packet filter, an application gateway, a stateful filter, a proxy server, or any other type of firewall.

In some implementations, the core switches 720 and 724 may be high-capacity switches that transfer packets within the environment 700. The core switches 720 and 724 may be configured as network bridges that quickly route data between different components within the on-demand database service environment. The use of two or more core switches 720 and 724 may provide redundancy and/or reduced latency.

In some implementations, communication between the pods 740 and 744 may be conducted via the pod switches 732 and 736. The pod switches 732 and 736 may facilitate communication between the pods 740 and 744 and client machines, for example via core switches 720 and 724. Also or alternatively, the pod switches 732 and 736 may facilitate communication between the pods 740 and 744 and the database storage 756. The load balancer 728 may distribute workload between the pods, which may assist in improving the use of resources, increasing throughput, reducing response times, and/or reducing overhead. The load balancer 728 may include multilayer switches to analyze and forward traffic.

In some implementations, access to the database storage 756 may be guarded by a database firewall 748, which may act as a computer application firewall operating at the database application layer of a protocol stack. The database firewall 748 may protect the database storage 756 from application attacks such as structure query language (SQL) injection, database rootkits, and unauthorized information disclosure. The database firewall 748 may include a host using one or more forms of reverse proxy services to proxy traffic before passing it to a gateway router and/or may inspect the contents of database traffic and block certain content or database requests. The database firewall 748 may work on the SQL application level atop the TCP/IP stack, managing applications' connection to the database or SQL management interfaces as well as intercepting and enforcing packets traveling to or from a database network or application interface.

In some implementations, the database storage 756 may be an on-demand database system shared by many different organizations. The on-demand database service may employ a single-tenant approach, a multi-tenant approach, a virtualized approach, or any other type of database approach. Communication with the database storage 756 may be conducted via the database switch 752. The database storage 756 may include various software components for handling database queries. Accordingly, the database switch 752 may direct database queries transmitted by other components of the environment (e.g., the pods 740 and 744) to the correct components within the database storage 756.

Figure 7B:
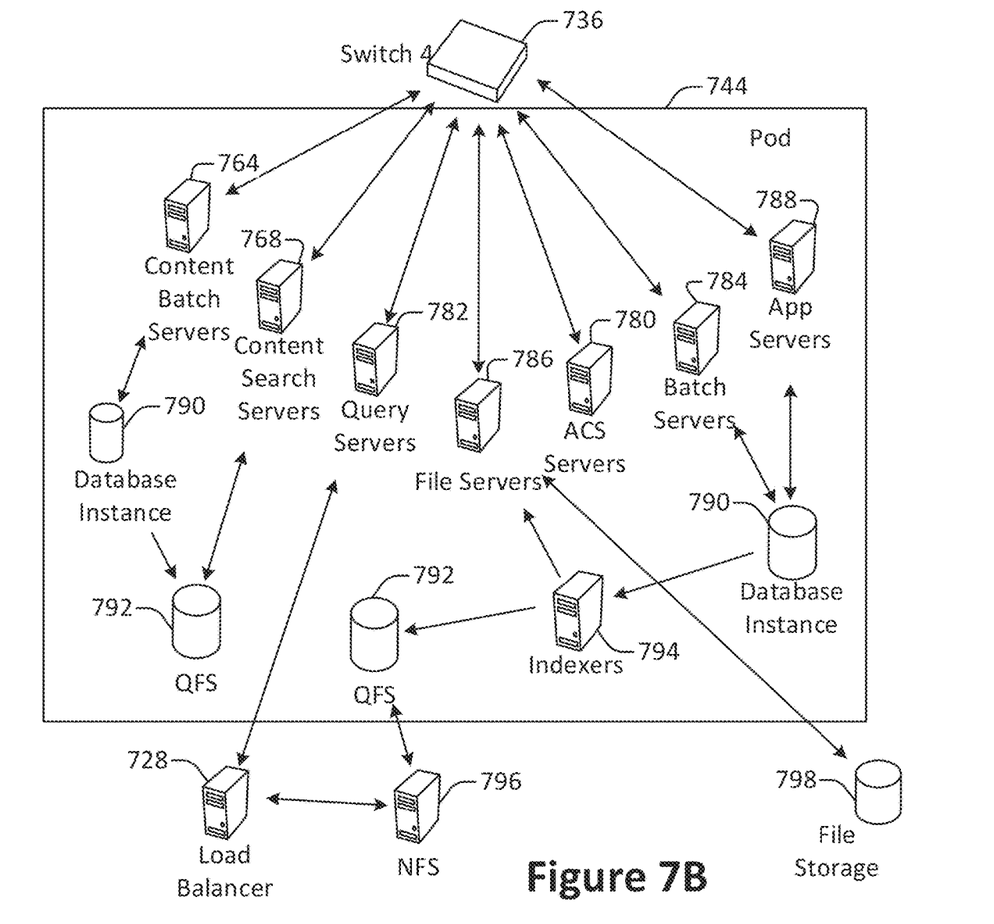
FIG. 7B shows a system diagram further illustrating an example of architectural components of an on-demand database service environment, in accordance with some implementations.

FIG. 7B shows a system diagram further illustrating an example of architectural components of an on-demand database service environment, in accordance with some implementations. The pod 744 may be used to render services to user(s) of the on-demand database service environment 700. The pod 744 may include one or more content batch servers 764, content search servers 768, query servers 782, file servers 786, access control system (ACS) servers 780, batch servers 784, and app servers 788. Also, the pod 744 may include database instances 790, quick file systems (QFS) 792, and indexers 794. Some or all communication between the servers in the pod 744 may be transmitted via the switch 736.

In some implementations, the app servers 788 may include a framework dedicated to the execution of procedures (e.g., programs, routines, scripts) for supporting the construction of applications provided by the on-demand database service environment 700 via the pod 744. One or more instances of the app server 788 may be configured to execute all or a portion of the operations of the services described herein.

In some implementations, as discussed above, the pod 744 may include one or more database instances 790. A database instance 790 may be configured as an MTS in which different organizations share access to the same database, using the techniques described above. Database information may be transmitted to the indexer 794, which may provide an index of information available in the database 790 to file servers 786. The QFS 792 or other suitable filesystem may serve as a rapid-access file system for storing and accessing information available within the pod 744. The QFS 792 may support volume management capabilities, allowing many disks to be grouped together into a file system. The QFS 792 may communicate with the database instances 790, content search servers 768 and/or indexers 794 to identify, retrieve, move, and/or update data stored in the network file systems (NFS) 796 and/or other storage systems.

In some implementations, one or more query servers 782 may communicate with the NFS 796 to retrieve and/or update information stored outside of the pod 744. The NFS 796 may allow servers located in the pod 744 to access information over a network in a manner similar to how local storage is accessed. Queries from the query servers 722 may be transmitted to the NFS 796 via the load balancer 728, which may distribute resource requests over various resources available in the on-demand database service environment 700. The NFS 796 may also communicate with the QFS 792 to update the information stored on the NFS 796 and/or to provide information to the QFS 792 for use by servers located within the pod 744.

In some implementations, the content batch servers 764 may handle requests internal to the pod 744. These requests may be long-running and/or not tied to a particular customer, such as requests related to log mining, cleanup work, and maintenance tasks. The content search servers 768 may provide query and indexer functions such as functions allowing users to search through content stored in the on-demand database service environment 700. The file servers 786 may manage requests for information stored in the file storage 798, which may store information such as documents, images, basic large objects (BLOBs), etc. The query servers 782 may be used to retrieve information from one or more file systems. For example, the query system 782 may receive requests for information from the app servers 788 and then transmit information queries to the NFS 796 located outside the pod 744. The ACS servers 780 may control access to data, hardware resources, or software resources called upon to render services provided by the pod 744. The batch servers 784 may process batch jobs, which are used to run tasks at specified times. Thus, the batch servers 784 may transmit instructions to other servers, such as the app servers 788, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 8:
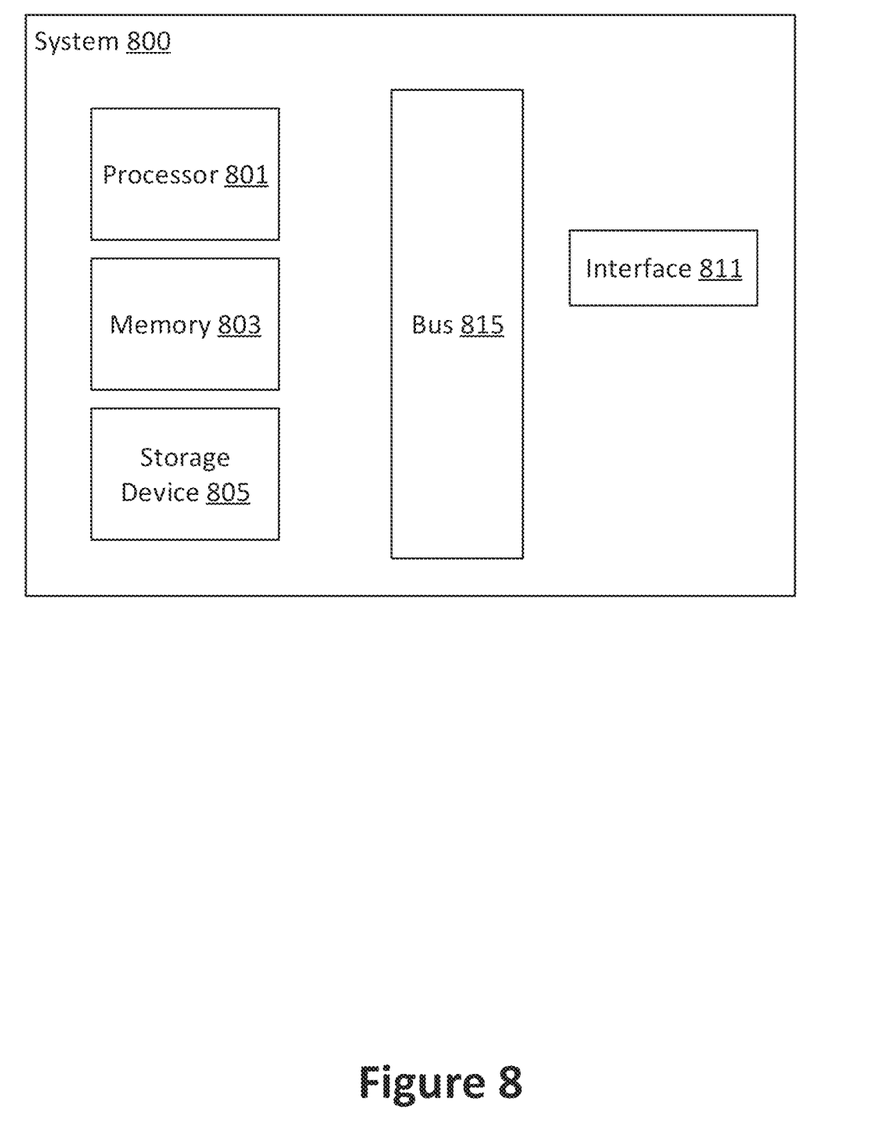
FIG. 8 illustrates one example of a computing device.

FIG. 8 illustrates one example of a computing device. According to various embodiments, a system 800 suitable for implementing embodiments described herein includes a processor 801, a memory module 803, a storage device 805, an interface 811, and a bus 815 (e.g., a PCI bus or other interconnection fabric.) System 800 may operate as variety of devices such as an application server, a database server, or any other device or service described herein. Although a particular configuration is described, a variety of alternative configurations are possible. The processor 801 may perform operations such as those described herein. Instructions for performing such operations may be embodied in the memory 803, on one or more non-transitory computer readable media, or on some other storage device. Various specially configured devices can also be used in place of or in addition to the processor 801. The interface 811 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
inserting a plurality of database records into a database system, the plurality of database records corresponding with a monotonic sequence of original index values, wherein inserting the plurality of database records involves transforming the original index values into transformed index values using a transformation function, the database records being stored in the database system according to the transformed index values, the transformation function mapping each of a plurality of ranges of original index values to a respective one of a plurality of transformed index values;
receiving a database query message at a database system at a communication interface via a network, the database query message including one or more parameters for retrieving data from a database based on a designated database record index value;
determining via a processor a database record index range based on the designated database record index value and the transformation function, the database record insertion index range identifying a plurality of database record insertion index values potentially resulting from applying the transformation function to the database record index value;
executing a database query against the database system to retrieve one or more database records based on the database record index range; and
transmitting a response message via the network, the response message identifying the one or more database records.

2. The method recited in claim 1, wherein each of the plurality of database record insertion index values is temporally located after the designated database record index value, and wherein the one or more parameters indicate a request to receive database records temporally located before the designated database record index value, and wherein the transformation function involves adding a designated value to the designated database record index value.

3. The method recited in claim 1, wherein each of the plurality of database record index values is temporally located before the designated database record index value, and wherein the one or more parameters indicate a request to receive database records temporally located after the designated database record index value, and wherein identifying the database record index value range involves subtracting a designated value from the designated database record index value.

4. The method recited in claim 1, wherein the database query includes a first stage identifying a first plurality of database records based on the database record index value range, and wherein the database query includes a second stage identifying a second plurality of database records based on the designated database record index value, the second plurality of database records being a subset of the first plurality of database records.

5. The method recited in claim 4, wherein each of the first plurality of database records is associated with a respective adjusted database record index value value, and wherein the first plurality of database records are identified by comparing the respective adjusted database record index value values to the database record index value range.

6. The method recited in claim 5, wherein each of the first plurality of database records is associated with a respective original database record index value value, and wherein the second plurality of database records are identified by comparing the respective original database record index value values to the designated database record index value.

7. The method recited in claim 1, wherein the transformation function includes a hash function portion that receives as inputs a primary key associated with the designated database record and the designated database record index value.

8. The method recited in claim 1, wherein the transformation function is invertible, and wherein executing a second stage of the database query involves inverting the transformation function for each of a first plurality of database records retrieved in a first stage of the database query.

9. The method recited in claim 1, wherein the transformation function includes a random number generation portion that returns a randomly generated number within a range of possible values.

10. The method recited in claim 1, wherein the transformation function includes a modulo function that receives as an input the designated database record index value.

11. The method recited in claim 1, wherein each of the plurality of database record index value values is temporally proximate to the designated database record index value.

12. The method recited in claim 1, wherein the database query message is received from an application in an on-demand computing services environment providing computing services to a plurality of organizations via the internet.

13. The method recited in claim 12, wherein the database system is a multitenant database system in which one or more database tables within the database each stores information associated with two or more of the plurality of organizations.

14. The method recited in claim 1, the method further comprising:
creating the database query by applying a transformation to the one or more parameters, the database query including one or more filters based on database record index value values, the one or more parameters not including the one or more filters.

15. A database system implemented using a server system, the database system configurable to perform a method comprising:
inserting a plurality of database records into a database system, the plurality of database records corresponding with a monotonic sequence of original index values, wherein inserting the plurality of database records involves transforming the original index values into transformed index values using a transformation function, the database records being stored in the database system according to the transformed index values, the transformation function mapping each of a plurality of ranges of original index values to a respective one of a plurality of transformed index values;
receiving a database query message at a database system at a communication interface via a network, the database query message including one or more parameters for retrieving data from a database based on a designated database record index value;
determining via a processor a database record index range based on the designated database record index value and the transformation function, the database record insertion index range identifying a plurality of database record insertion index values potentially resulting from applying the transformation function to the database record index value;
executing a database query against the database system to retrieve one or more database records based on the database record index range; and
transmitting a response message via the network, the response message identifying the one or more database records.

16. The database system recited in claim 15, wherein each of the plurality of database record index value values is temporally located after the designated database record index value, and wherein the one or more parameters indicate a request to receive database records temporally located before the designated database record index value, and wherein identifying the database record index value range involves adding a designated value to the designated database record index value.

17. The database system recited in claim 15, wherein the database query includes a first stage identifying a first plurality of database records based on the database record index value range, wherein the database query includes a second stage identifying a second plurality of database records based on the designated database record index value, the second plurality of database records being a subset of the first plurality of database records, wherein each of the first plurality of database records is associated with a respective adjusted database record index value, and wherein the first plurality of database records are identified by comparing the respective adjusted database record index value values to the database record index value range, wherein each of the first plurality of database records is associated with a respective original database record index value, and wherein the second plurality of database records are identified by comparing the respective original database record index value values to the designated database record index value.

18. The database system recited in claim 15, wherein the designated database record index value is mapped to one of the plurality of database record index value values via a timestamp mapping function.

19. One or more non-transitory computer-readable media having stored thereon computer instructions capable of causing a computer to perform a method, the method comprising:
inserting a plurality of database records into a database system, the plurality of database records corresponding with a monotonic sequence of original index values, wherein inserting the plurality of database records involves transforming the original index values into transformed index values using a transformation function, the database records being stored in the database system according to the transformed index values, the transformation function mapping each of a plurality of ranges of original index values to a respective one of a plurality of transformed index values;
receiving a database query message at a database system at a communication interface via a network, the database query message including one or more parameters for retrieving data from a database based on a designated database record index value;
determining via a processor a database record index range based on the designated database record index value and the transformation function, the database record insertion index range identifying a plurality of database record insertion index values potentially resulting from applying the transformation function to the database record index value;
executing a database query against the database system to retrieve one or more database records based on the database record index range; and
transmitting a response message via the network, the response message identifying the one or more database records.

* * * * *